US011983950B2

(12) United States Patent
James et al.

(10) Patent No.: US 11,983,950 B2
(45) Date of Patent: *May 14, 2024

(54) ENTITY IDENTIFICATION USING MACHINE LEARNING

(71) Applicant: X Development LLC, Mountain View, CA (US)

(72) Inventors: Barnaby John James, Campbell, CA (US); Grace Taixi Brentano, Redwood City, CA (US); Christopher Thornton, Vancouver (CA)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/172,141

(22) Filed: Feb. 21, 2023

(65) Prior Publication Data

US 2023/0282020 A1 Sep. 7, 2023

Related U.S. Application Data

(63) Continuation of application No. 17/094,380, filed on Nov. 10, 2020, now Pat. No. 11,594,058.

(Continued)

(51) Int. Cl.
*G06V 40/10* (2022.01)
*A01K 61/95* (2017.01)
(Continued)

(52) U.S. Cl.
CPC .............. *G06V 40/10* (2022.01); *A01K 61/95* (2017.01); *A01K 63/02* (2013.01); *F24F 11/30* (2018.01);
(Continued)

(58) Field of Classification Search
CPC ........ G06V 40/10; G06V 10/25; G06V 20/52; G06V 10/7715; G06V 10/40; G06V 10/44;
(Continued)

(56) References Cited

U.S. PATENT DOCUMENTS 10,064,396 B2 9/2018 Lyngoy
10,856,520 B1 12/2020 Kozachenok et al.
(Continued)

FOREIGN PATENT DOCUMENTS

CL 2019000039 A1 3/2019
CN 108040948 5/2018
(Continued)

OTHER PUBLICATIONS

[No Author Listed], "2020 The State of World Fisheries and Aquaculture," Food and Agriculture Organization of the United Nations, 2020, 224 pages.

(Continued)

*Primary Examiner* — Michael R Neff
(74) *Attorney, Agent, or Firm* — Fish & Richardson P.C.

(57) ABSTRACT

Methods, systems, and apparatus, including computer programs encoded on computer storage media for identification and re-identification of fish. In some implementations, first media representative of aquatic cargo is received. Second media based on the first media is generated, wherein a resolution of the second media is higher than a resolution of the first media. A cropped representation of the second media is generated. The cropped representation is provided to the machine learning model. In response to providing the cropped representation to the machine learning model, an embedding representing the cropped representation is generated using the machine learning model. The embedding is mapped to a high dimensional space. Data identifying the (Continued)

aquatic cargo is provided to a database, wherein the data identifying the aquatic cargo comprises an identifier of the aquatic cargo, the embedding, and a mapped region of the high dimensional space.

20 Claims, 6 Drawing Sheets

Related U.S. Application Data

(60) Provisional application No. 62/934,186, filed on Nov. 12, 2019.

(51) Int. Cl.
| | |
|---|---|
| A01K 63/02 | (2006.01) |
| F24F 11/30 | (2018.01) |
| G06F 18/213 | (2023.01) |
| G06F 18/214 | (2023.01) |
| G06F 18/22 | (2023.01) |
| G06F 18/2413 | (2023.01) |
| G06N 20/00 | (2019.01) |
| G06T 3/40 | (2006.01) |
| G06V 10/24 | (2022.01) |
| G06V 10/25 | (2022.01) |
| G06V 10/40 | (2022.01) |
| G06V 10/44 | (2022.01) |
| G06V 10/762 | (2022.01) |
| G06V 10/764 | (2022.01) |
| G06V 10/77 | (2022.01) |
| G06V 20/52 | (2022.01) |
| G06V 20/80 | (2022.01) |

(52) U.S. Cl.
CPC .......... *G06F 18/213* (2023.01); *G06F 18/214* (2023.01); *G06F 18/22* (2023.01); *G06F 18/2413* (2023.01); *G06N 20/00* (2019.01); *G06T 3/40* (2013.01); *G06V 10/245* (2022.01); *G06V 10/25* (2022.01); *G06V 10/40* (2022.01); *G06V 10/44* (2022.01); *G06V 10/762* (2022.01); *G06V 10/764* (2022.01); *G06V 10/7715* (2022.01); *G06V 20/52* (2022.01); *G06V 20/80* (2022.01); *F24F 2221/225* (2013.01)

(58) Field of Classification Search
CPC .... G06V 20/80; G06V 10/764; G06V 10/245; A01K 61/95; A01K 63/02; G06N 20/00; G06F 18/22; G06F 18/2413; G06F 18/214; G06F 18/213
USPC ........................................................ 382/110
See application file for complete search history.

(56) References Cited

U.S. PATENT DOCUMENTS

| 10,902,237 | B1 | 1/2021 | Aggarwal et al. | |
|---|---|---|---|---|
| 11,030,726 | B1 | 6/2021 | Minor | |
| 11,594,058 | B2* | 2/2023 | James ................... | G06V 10/764 |
| 2017/0150701 | A1 | 6/2017 | Gilmore et al. | |
| 2019/0228218 | A1 | 7/2019 | Barnaby et al. | |
| 2019/0340440 | A1 | 11/2019 | Atwater et al. | |
| 2020/0107524 | A1 | 4/2020 | Messana et al. | |
| 2020/0155882 | A1 | 5/2020 | Tohidi et al. | |
| 2020/0288678 | A1 | 9/2020 | Howe et al. | |

FOREIGN PATENT DOCUMENTS

| EP | 2244934 | 11/2010 |
|---|---|---|
| EP | 3484283 | 5/2019 |
| JP | 2002171853 | 6/2002 |
| NO | 300401 | 5/1997 |
| NO | 20160199 | 8/2017 |
| NO | 345829 | 10/2019 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO 2012/081990 | 6/2012 |
| WO | WO 2014/179482 | 11/2014 |
| WO | WO 2016/063033 | 4/2016 |
| WO | WO 2017/137896 | 8/2017 |
| WO | WO 2017/153417 | 9/2017 |
| WO | WO 2018/011744 | 1/2018 |
| WO | WO 2018/011745 | 1/2018 |
| WO | WO 2018/117850 | 6/2018 |
| WO | WO 2019/002881 | 1/2019 |
| WO | WO 2019/121851 | 6/2019 |
| WO | WO 2019/168406 | 9/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

Aunsmo et al., "Accuracy and precision of harvest stock estimation in Atlantic salmon farming," Aquaculture, Mar. 2013, 369(399):113-118.

Aunsmo et al., "Field validation of growth models used in Atlantic salmon farming," Aquaculture, Mar. 2014, 428(429):249-257.

Boldt et al., "Development of stereo camera methodologies to improve pelagic fish biomass estimates and inform ecosystem management in marine waters," Fisheries Research, 2018, 198:66-77.

Costello et al., "The future of food from the sea," Nature, Dec. 2020, 588:95-100.

Crippa et al., "Food systems are responsible for a third of global anthropogenic GHG emissions," Nature Food, Mar. 2021, 2:198-209.

Extended Search Report in European Appln. No. 22151132.2, dated May 2, 2022, 10 pages.

Fore et al., "Precision fish farming: A new framework to improve production in aquaculture," Biosystems Engineering, Nov. 2017, 173:176-193.

Fry et al., "Feed conversion efficiency in aquaculture: do we measure it correctly?," Environ. Res. Lett., Feb. 2018, 13:024017.

Harvey et al., "The accuracy and precision of underwater measurements of length and maximum body depth of southern bluefin tuna (*Thunnus maccoyii*) with a stereo-video camera system," Fisheries Research, Sep. 2003, 63(3):315-326.

Hilborn et al., "The environmental cost of animal source foods," Front Ecol Environ, 2018, 16(6):329-335.

Hockaday et al., "Using truss networks to estimate the biomass of Oreochromis niloticus, and to investigate shape characteristics," Journal of Fish Biology, May 2000, 57:981-1000.

International Preliminary Report on Patentability in International Appln. No. PCT/US2020/059829, dated May 27, 2022, 11 pages.

International Search Report and Written Opinion in International Appln No. PCT/US2022/018651, dated Jun. 22, 2022, 14 pages.

International Search Report and Written Opinion in International Appln No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

International Search Report and Written Opinion in International Appln No. PCT/US2022/022837, dated Aug. 2, 2022, 14 pages.

(56) References Cited

OTHER PUBLICATIONS

International Search Report and Written Opinion in International Appln. No. PCT/US2020/059829, dated Feb. 25, 2021, 18 pages.
International Search Report and Written Opinion in International Appln No. PCT/US2022/023831, dated Jul. 8, 2022, 13 pages.
Kang et al., "A Study on the Search of Optimal Aquaculture farm condition based on Machine Learning," The Journal of The Institute of Internet, Broadcasting and Communication, Apr. 2017, 17(2):135-140.
Macleod et al., "Quantifying and mitigating greenhouse gas emissions from global aquaculture," FAO Fisheries and Aquaculture Technical Paper, Mar. 2019, 626:50 pages.
Maloy et al., "A spatio-temporal recurrent network for salmon feeding action recognition from underwater videos in aquaculture," Computers and Electronics in Agriculture, Nov. 12, 2019, 9 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Murray et al., "Using the H-index to assess disease priorities for salmon aquaculture," Preventive Veterinary Medicine, Apr. 2016, 126:199-207.
Odey, "AquaMesh—Design and Implementation of Smart Wireless Mesh Sensor Networks for Aquaculture," American Journal of Networks and Communications, Jul. 2013, 8 pages.
Parker et al., "Fuel use and greenhouse gas emissions of world fisheries," Nature Climate Change, Apr. 2018, 8:333-337.
PCT International Search Report and Written Opinion in International Appln. No. PCT/US2020/059829, dated Feb. 25, 2021, 18 pages.
Pérez et al., "Automatic measurement of fish size using stereo vision," 2018 IEEE International Instrumentation and Measurement Technology Conference, May 2018, 6 pages.
Petrov et al., "Overview of the application of computer vision technology in fish farming," E3S Web of Conferences, 2020, 175:02015.
Pettersen et al., "Detection and classification of lepeophterius salmonis (krøyer, 1837) using underwater hyperspectral imaging," Aquacultural Engineering, Nov. 2019, 87:102025.
Qiu et al., "Improving Transfer Learning and Squeeze-and-Excitation Networks for Small-Scale Fine-Grained Fish Image Classification," IEEE Access, Dec. 2018, 6(31):78503-78512.
Rahman et al., "Developing an Ensembled Machine Learning Prediction Model for Marine Fish and Aquaculture Production," Sustainability, 2021, 13:9124.
Saberloon et al., "Application of Machine Vision Systems in Aquaculture with Emphasis on Fish: State-of-the-Art and Key Issues," Reviews in Aquaculture, Dec. 2017, 9:369-387.
Shafait et al., "Towards automating underwater measurement of fish length: a comparison of semi-automatic and manual stereovideo measurements," ICES Journal of Marine Science, 2017, 12 pages.
Stein et al., "Consistent melanophore spot patterns allow long-term individual recognition of Atlantic salmon Salmo Salar," Journal of Fish Biology, Nov. 2017, 91(6):1699-1712.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Troell et al., "Does aquaculture add resilience to the global food system?," PNAS, Sep. 2014, 111(37):13257-13263.
Wang, "Robust tracking of fish schools using CNN for head identification," Multimedia Tools and Applications, Nov. 2017, 20 pages.
Yang et al., "Deep learning for smart fish farming: applications, opportunities and challenges," Reviews in Aquaculture, 2021, 13(1):66-90.

* cited by examiner

ENTITY IDENTIFICATION USING MACHINE LEARNING

CROSS-REFERENCE TO RELATED APPLICATION

This patent application is a continuation (and claims the benefit of priority under 35 USC 120) of U.S. patent application Ser. No. 17/094,380, filed Nov. 10, 2020, which claims the benefit of priority under 35 U.S.C. 119 of U.S. Provisional Application No. 62/934,186, filed on Nov. 12, 2019, the contents of which are incorporated by reference herein.

FIELD

This specification generally relates to machine learning.

BACKGROUND

It is difficult for a person or a machine to discern between different fish of the same species. For example, it is difficult for a person to tell two different salmon apart.

SUMMARY

In some implementations, the specification describes techniques for identifying and re-identifying fish using their characteristics. In particular, these techniques facilitate differentiating between fish of a similar species by using a machine learning model. The machine learning model can be trained to generate an identification of a particular fish based on the characteristics of that fish. At a later point in time, the machine learning model can re-identify the particular fish that it previously recognized. For example, some fish, such as salmon, exhibit spot patterns that are thought to be unique and identifiable over time. While original spots may grow in size and new spots may develop on salmon, the pattern and orientation of the original spots remain as the salmon ages. In this manner, the machine learning model can be trained using various techniques to identify a particular fish, such as salmon, using its unique and identifiable spots, stripes, or patterns, to name a few examples. At a later point in time, the machine learning model can receive a cropped image of a fish and generate an embedding that represents an identification of the fish. The machine learning model generates the embedding based on the identification of spots on the fish as well as other characteristics associated with the fish.

The techniques describe mapping the generated embedding to a particular point in a high dimensional space. The high dimensional space may include a region, such as a cluster, that identifies fish with similar characteristics. In some implementations, the high dimensional space may include multiple regions. The generated embedding, which corresponds to the particular point in the high dimensional space, is mapped in the high dimensional space, and compared to other embeddings within the various clusters. If the generated embedding does not closely resemble other previously mapped embeddings, the techniques may indicate a new fish has been detected, e.g., identified. If the generated embedding does closely resemble other previously mapped embeddings, the techniques may indicate that this particular fish matches to previously mapped embedding and is thus re-identified.

In the context of aquaculture, recognition of fish over prolonged periods starting from smolt to adult makes measurements, e.g., location, size, disease, condition, and sex, of fish far more valuable. For example, the ability to perform longitudinal or life studies is limited by the ability to operate in real ocean conditions for large scale fish production that includes at least 200,000 fish for interaction. For example, fish in a large scale fish production can include problems and weight fluctuations that can be tracked over time. The problems can include disease, parasites, deformities, and lesions, to name a few examples. When representative images of fish are captured and identified, it becomes possible to track disease or developmental problems associated with the fish in the fish pen. Additionally, by attaching other metadata such as temperature data, depth data, image data, cluster mapping data, or location data of fish in the pen, it becomes possible to construct a precise history for each fish in the fish pen.

In some implementations, the number of unique fish to track should approach an asymptotic limit over time that matches the true population of fish found in the pen. In particular, fish existing in a pen may not be evenly distributed due to some fish existing in a weakened state, e.g., runts in a pen or otherwise compromised fish. These runts may swim closer to the surface and the edges of a fish pen. With a sufficiently large population of identifiable fish, detecting fish having rare phenomena, e.g., sick fish, fish with spine deformities, or other health problems, becomes possible by monitoring near the edges of the net of the fish pen, e.g., where sick fish tend to remain. In this case, the over sampling of the same fish becomes less likely.

In some cases, the tracking fish enables identification of disease spreading and subpopulations within the larger pen. For example, if one fish is frequently collocated with another fish, than a correlation between a location or population of these fish and a sickness may help identify runts and track areas within the pen that promote unhealthy fish based on issues within the pen. For example, some diseases, such as pancreatic disease, present lethargy and muscle weakness in fish. Consequently, ocean current would push these fish against the sides of the net in the fish pen and hold them in place given the inability for these fish to swim against the current.

Additionally, one important benefit for tracking fish identification relates to pre-selling boxes of fish, e.g., salmon, at an advertised weight to consumers. For example, it is common practice in aquaculture to pre-sell the boxes of salmon advertised at a particular weight, even though it may be uncertain whether a stock of a box of salmon meets this advertised weight. Techniques for identifying and re-identifying fish allow for better estimates of a population size at a given mass to make pre-sales more accurate, thereby enabling the delivery of fresher fish. The improvement with this technique eliminates the need to ship in salmon from another location to fulfill pre-sale advertised weight of the box of salmon.

Another benefit includes the ability to provide a history of an individual fish over time. In particular, a consumer can analyze the growth of that fish over time using pictures and other characteristic data that describes the fish as it develops. The null hypothesis is that all fish grow at the same rate but this is not the case that would have an impact on feeding, particularly, the relative growth history of over performing and under performing fish.

Additionally, in the post-mortem processing facility, dead fish are weighed by a weigh bridge and then either sent to be packed in a pre-sold box or is filleted. Knowing the identity and associated condition of a fish prior to arriving at the weigh bridge would optimize the overall monitoring associated with the dead fish.

In a general aspect, a method includes: receiving, by the one or more processors, first media representative of aquatic cargo; generating, by the one or more processors, second media based on the first media, wherein a resolution of the second media is higher than a resolution of the first media; generating, by the one or more processors, a cropped representation of the second media; providing, by the one or more processors, the cropped representation to a machine learning model; in response to providing the cropped representation to the machine learning model, generating, by the one or more processors, an embedding representing the cropped representation using the machine learning model; mapping, by the one or more processors, the embedding to a high dimensional space; and providing, by the one or more processors, data identifying the aquatic cargo to a database, wherein the data identifying the aquatic cargo comprises an identifier of the aquatic cargo, the embedding, and a mapped region of the high dimensional space.

Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, mapping the embedding to the high dimensional space includes: comparing, by the one or more processors, the embedding to one or more previously mapped embeddings; in response to comparing the embedding to the one or more previously mapped embeddings, determining, by the one or more processors, that the embedding matches to a second embedding; and providing, by the one or more processors, a notification that the aquatic cargo associated with the embedding has been re-identified.

In some implementations, mapping the embedding to the high dimensional space includes: comparing, by the one or more processors, the embedding to one or more previously mapped embeddings; in response to comparing the embedding to the one or more previously mapped embeddings, determining, by the one or more processors, that the embedding does not match to a second embedding; and providing, by the one or more processors, a notification that the aquatic cargo associated with the embedding is newly identified.

In some implementations, mapping the embedding to the high dimensional space includes: comparing, by the one or more processors, the embedding to one or more ideal embeddings, wherein each ideal embedding is associated with a particular cluster; in response to comparing the embedding to the one or more ideal embeddings, determining, by the one or more processors, that the embedding corresponds to a particular cluster in a high dimensional vector space; and providing, by the one or more processors, a notification to the database that the aquatic cargo associated with the embedding corresponds to the particular cluster.

In some implementations, wherein the mapped region of the high dimensional space corresponds to a cluster, wherein the cluster identifies one or more characteristics associated with aquatic cargo, and the high dimensional space comprises multiple clusters.

In some implementations, generating the cropped representation of the second media further includes: generating, by the one or more processors, key points associated with the second media of the aquatic cargo; generating, by the one or more processors, a midpoint line using at least two of the key points in the second media; generating, by the one or more processors, an extended line from a midpoint of the midpoint line to another key point in the second media; generating, by the one or more processors, an orthogonal line from the midpoint in the second media; shifting, by the one or more processors, the orthogonal line to a second key point in the second media; generating, by the one or more processors, a shift in the other key point in the second media; duplicating, by the one or more processors, the orthogonal line and associating the duplicated orthogonal line with the shifted key point in the second media; generating, by the one or more processors, trapezoidal points associated with the shifted orthogonal line and the duplicated orthogonal line in the second media; connecting, by the one or more processors, the trapezoidal points to form a trapezoid in the second media; extracting, by the one or more processors, the trapezoid in the second media; and providing, by the one or more processors, the cropped representation of the second media using the extracted trapezoid.

In some implementations, wherein the key points associated with the aquatic cargo comprise a dorsal fin of the aquatic cargo, a pectoral fin of the aquatic cargo, and an eye of the aquatic cargo.

In some implementations, the method further includes: determining, by the one or more processors, whether the second media comprises the dorsal fin of the aquatic cargo, the pectoral fin of the aquatic cargo, and the eye of the aquatic cargo; and in response to determining that the second media does not comprise at least one of the dorsal fin of the aquatic cargo, the pectoral fin of the aquatic cargo, and the eye of the aquatic cargo, discarding, by the one or more processors, the second media.

In some implementations, wherein the embedding includes a 128 dimensional vector.

In some implementations, the method further includes: generating, by the one or more processors, positive data representative of a type of aquatic cargo to be identified by the machine learning model; generating, by the one or more processors, negative data representative of other aquatic cargo not to be identified by the machine learning model; generating, by the one or more processors, one or more anchors in the positive data for the machine learning model to track; and training, by the one or more processors, the machine learning model using a triplet loss function, wherein the triplet loss function utilizes the positive data, the negative data, and anchor data to refine weights of the machine learning model.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
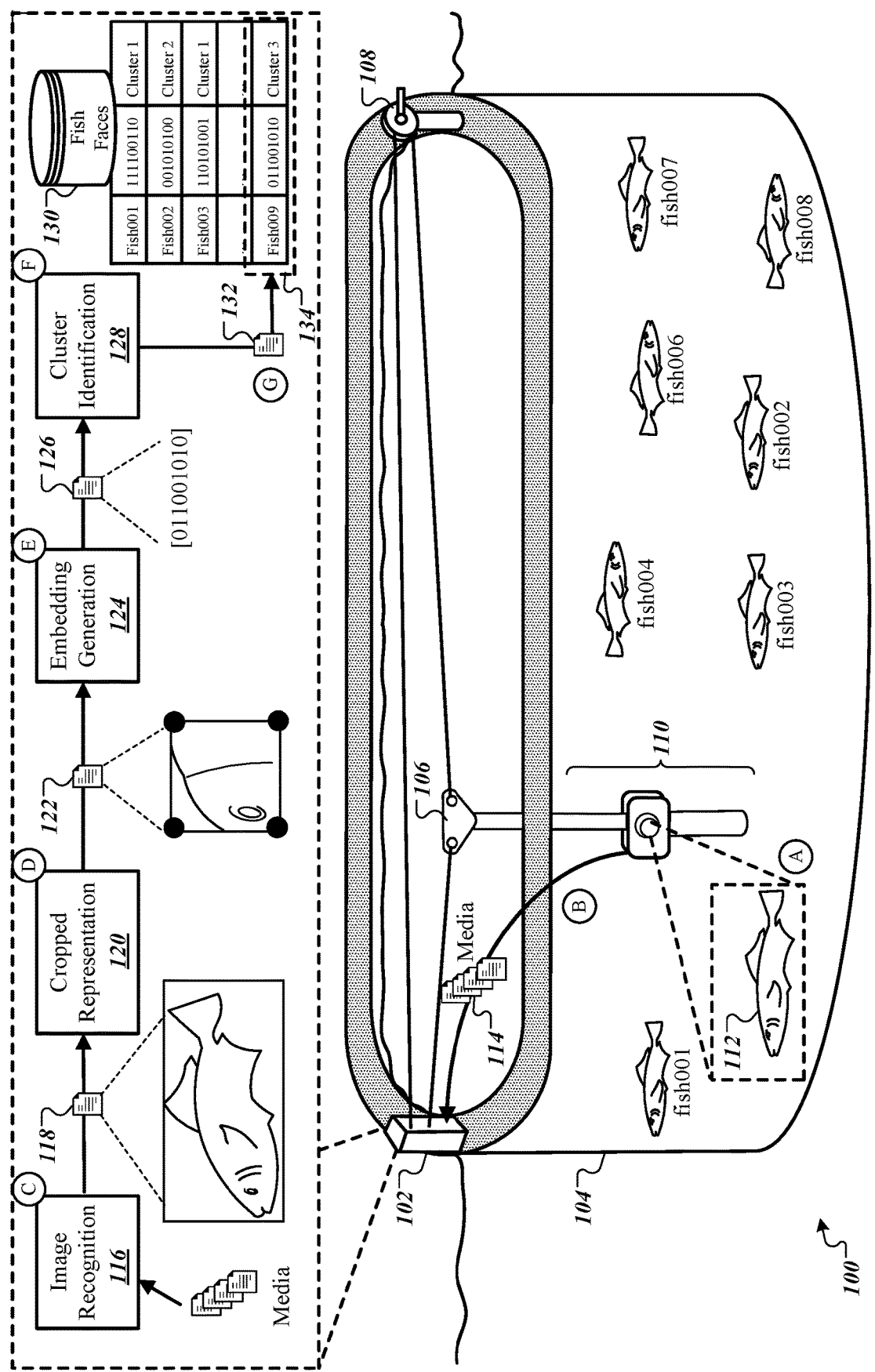
FIG. 1 is a diagram of an example configuration of a system for identification of a fish within an aquatic structure.

FIG. 1 is a diagram of an example configuration of a system 100 for identification of fish within a structure 104. In some examples, fish can be identified through a pipeline structure, in which fish move at a single file through the line pipeline. In this example of system 100, the structure 104 is an off-shore cage that contains live fish. The structure 104 is configured to maintain and store aquatic cargo, such as, fish, in the open ocean and allow the aquatic cargo to move freely and be monitored. The structure 104 is configured to be located in the open ocean at a particular location and allow the aquatic cargo, such as salmon or other fish, to pass freely through an exoskeleton of the structure 104.

The exoskeleton of the structure 104 can be a net or a mesh material. For example, the net material can include one or more holes that are large enough to facilitate the aquatic cargo to pass through, or small enough so no aquatic cargo can pass, and only water from the open ocean flows through the structure 104. In this case in which the holes are too small, operators of the structure 104 can manually provide fish in to the structure 104 for tracking and monitoring.

Users observing the aquatic cargo can walk along a catwalk that is situated atop of the structure 104. In some implementations, the catwalk can be wide enough so that multiple individuals can walk across the catwalk. Additionally, the top of the catwalk of the structure 104 can include a hole large enough for devices, fish, and individuals to enter the internal area of the structure 104. In some implementations, a camera actuation system sits on top of the catwalk of the structure 104 for stability. The camera actuation system, which is further described below, is used to capture media of aquatic cargo within the structure 104.

The structure 104 is a free-floating structure located in the open ocean configured to contain and allow users to monitor aquatic cargo. Buoys may be used to support the location and positioning of the structure 104, such that the structure 104 does not drift with the ocean current.

In some implementations, the structure 104 has an exoskeleton covered by a mesh netting. The mesh netting can have a hole size based on the size of the aquatic cargo contained within the structure 104. For example, if the average size of an aquatic cargo is 12 centimeters (cm) in diameter, the holes of the mesh netting can be 10 cm in diameter to prevent the cargo from exiting the structure 104. In some implementations, the mesh netting covering the exoskeleton of the structure 104 is made from material that can withstand strong ocean currents, such as iron, steel, etc. In some implementations, the structure 104 does not include mesh netting, but is environmentally sealed to protect the cargo from ocean water. In this instance, a user can view the aquatic cargo from outside the structure 104 by looking through the structure 104 or by looking down from or through the catwalk. The outside exoskeleton of the structure 104 can be a translucent material or a fully transparent material.

In some implementations, the aquatic cargo stored within the structure 104 can include finfish or other aquatic lifeforms. The cargo can include for example, juvenile fish, koi fish, salmon, sharks, trout, and bass, to name a few examples. In one example, the cargo can include individual fish and the system 100 can monitor the life maturity of the juvenile fish within the structure 104.

In some implementations, the structure 104 encompasses a wide volume to handle a large amount of aquatic cargo. For example, the volume of the structure 104 can be approximately 5,000,000 $ft^3$ or some other lesser volume. The structure 104 can have cylindrical shape, a spherical shape, or some other shape. The cylindrical shape can include a sealable opening at the bottom of the structure 104 to allow cargo to be inserted and released.

The system 100 can also include a monitoring server 102 that communicates with a camera capture unit 110. The monitoring server 102 can include one or more servers that communicate with the camera capture unit 110 in a wireless or wired manner. For example, the monitoring server 102 can communicate with the camera capture unit 110 over Bluetooth or Wi-Fi. The monitoring server 102 can include one or more processors (CPUs), one or more internal and external memory devices, and other computer components. The monitoring server 102 can also communicate with a fish faces database 130 over a network, e.g., wireless or wired network.

The monitoring server 102 can include an image recognition module 116, a cropped representation module 120, an embedding generation module 124, and a cluster identification module 128. The image recognition module 116 can generate a high resolution image of aquatic cargo using captured media of the aquatic cargo. The cropped representation module 120 performs a transformation on the high resolution image of the aquatic cargo to generate a cropped image of the aquatic cargo. The embedding generation module 124 includes a machine learning model that generates an embedding of the cropped image of the aquatic cargo. The embedding represents an identification of the aquatic cargo. The cluster identification module 128 maps the generated embedding to a high dimensional vector space and determines whether the embedding matches to a previously generated embedding or is a new embedding altogether. Additionally, the cluster identification module 128 may map the generated embedding to a particular cluster within the high dimensional vector space. Lastly, the monitoring server 102 stores data identifying the fish, the generated embedding, and the particular cluster in the fish faces database 130. Each of these modules will be further described in detail below.

In some implementations, the monitoring server 102 can also be located above or below the water level. The monitoring server 102 can also include power supply components, communication and control components, and a feeding mechanism component. In some implementations, each of these components and modules are sealed off from being penetrated by water. The communication and control component can include sensors and electronics sensitive to water damage, and thus, must be kept dry to function. The feeding mechanism component enables fish to be fed through a feed bin that contains feed for the aquatic cargo. In some implementations, the feeding mechanism can help with capturing images of fish during the fish identification process. In particular, the feeding mechanism can draw fish to a central location, e.g., the feeder, to ensure the camera unit 110 can see all the fish versus having to move the camera unit 110 throughout the pen to capture media of various fish.

In some implementations, the monitoring server 102 can monitor the position of the camera capture unit 110 within the structure 104. For example, a remote server or remote client device may instruct the monitoring server 102 to position the camera capture unit 110 within the structure 104. The movement of the camera can be in real-time or can be based on a predetermined path within the structure 104 provided by the remote device. In some implementations, the movement of the camera can be based on following a particular fish, a school of fish, or to a particular location have a depth within the structure 104. In some cases, the monitoring server 102 may move the camera capture unit to the feeding mechanism while food is being fed to the fish. A certain type of fish may desired to be captured and recorded and the feeding mechanism may provide food known to be eaten only by that certain type of fish.

The monitoring server 102 can maneuver the camera capture unit 110 using a far side pulley 108, an attachment bracket 106, and one or more pulleys included within the monitoring server. The monitoring server 102 connects to the far side pulley 108 and the attachment bracket with ropes or cable wires. The monitoring server 102 moves the camera capture unit 110 by moving its pulleys, which moves the far side pulley 108, and consequentially, moves the camera capture unit 110 to a desired location within the structure 104. The desired location can be modeled by X, Y, and Z coordinates within the structure 104, which can be used to place the position of the camera capture unit for capturing media of aquatic cargo.

In some implementations, the camera capture unit 110 can include one or more components to capture media of fish within the structure 104. For example, the camera capture unit 110 can include a stereo camera, a 3-D camera, or an action camera, or any combination of these cameras. In other implementations, the camera capture unit 110 can include one or more other sensor types in addition to the one or more media capture components. For example, the one or more other sensor types can include pressure sensors, a hydrophone, a water quality sensor, a stereo camera system, a camera system, an HD camera system, ultrasound sensors, thermal sensors, or x-ray sensors, to name a few examples.

In some implementations, the camera included in the camera capture unit 110 can be positioned at different vertical and rotational positions. For example, as illustrated in system 100, the camera can be moved downward or upward along the vertical rod of the camera capture unit 110 to a particular depth. Additionally, the camera can be rotated around the vertical rod at a particular angle, the angle ranging from 0 to 360 degrees. The monitoring server 102 can provide instructions to the camera at the camera capture unit 110 to be placed at a particular position on the vertical rod. In some implementations, the monitoring server 102 will provide instructions to the camera capture unit 110 to capture media of a particular fish within the structure 104.

Additionally, the camera capture unit 110 can transmit media of the aquatic cargo to the monitoring server 102. For example, the data include a transmission of live video feed the camera of the camera capture unit 110, pre-recorded media from the camera, sensor data, power supply information, and a health status of the camera capture unit 110. Additionally, the data from the camera capture unit can include thermal imaging data from the sensors of the camera capture unit 110, data from pressure sensors that indicate a strength of the ocean current moving through the structure 104, data from a water quality sensor indicating turbidity of water, and data from a hydrophone recording sounds from within the structure 104. The sensor data helps the monitoring server 102 determine whether to keep or drop the corresponding recorded media.

The system 100 illustrates performing a fish identification process on one or more fish within the structure 104. The process creates a variety of benefits that are accrued over the maturation of an identified fish, and even, during the post-mortem process for the identified fish. This process is not only beneficial to the aquaculture farmer monitoring the fish, but also for traceability for the consumer, in which the consumer can view the life cycle of a particular fish that has been identified in the structure 104.

For example, storing identification of fish in the fish faces database 130 enables tracking of fish over a period of time. The tracking can be performed from the time a fish is a juvenile to an adult and can include the location of a fish, the size of the fish, conditions associated with the fish, the sex of the fish, and how various environmental, growth, and health factors are correlated with the sex of a fish. Additionally, problems associated with fish can be tracked over time, such as by storing the problems in the fish faces database 130 as the fish matures. Problems can include disease, whether parasites exist, various deformities, and lesions. Weight increase or decrease can also be tracked.

The evolution of the fish, including diseases acquired by the fish, becomes possible to monitor by storing images and identification data associated with the fish. The monitoring server 102 can also store data associated with the fish identification in the fish faces database 130, such as metadata describing the temperature of the water within the structure 104, depth and/or location of the fish within the structure 104, and turbidity of the water within the structure 104. By storing this data or metadata, it becomes possible to construct a precise history for each fish's development in the structure 104.

In some implementations, the number of unique aquatic cargo within the structure 104 should approach an asymptotic limit over time that matches a true population of the aquatic cargo. The number of unique aquatic cargo may not be evenly distributed in the structure, which may be modeled, for example, by non-ergodic distribution. In this case, non-ergodic distribution is particularly true for weakened fish, e.g., runts or other compromised fish that swim closer to the surface and the edges of the structure 104. If the structure 104 includes a large population of identifiable fish, the true distribution can be determined by limiting the extent to which different populations are over or under sampled. Thus, by tracking identifications of fish and tracking associations of fish, such as two fish which were frequently collocated, the identification of disease spreading and sub-populations within the structure 104 becomes possible.

Fish identification also offers better estimates of population size at a given mass, which can aid sales of such fish. For example, it is common practice in aquaculture to pre-sell boxes of salmon at a given weight, even though it is uncertain whether the given weight of the boxes of salmon can be fulfilled by a given stock. With the identification of salmon, the estimates of population size at a given mass make pre-sales of salmon more accurate, thereby enabling the delivery of fresher fish and eliminating the need to ship salmon from other locations to fulfill pre-sale promises.

Additionally, in the post-mortem processing facility, the fish are weighed and then either sent to be packed in a pre-sold box or filleted because they do not meet the ideal weight recommendation. Therefore, by knowing the identity and associated condition of a fish prior to arriving at the post-mortem processing facility, where the fish is weighed, the post-mortem to pre-sale process can be further enhanced.

Additionally, fish identification allows various fish of a same species to be identified, re-identified, and tracked over time. For example, tracking fish include tracking spot patterns associated with the fish over time. Spot patterns have a small genetic component and a large environmental component, so one may be able to record details about the optimal environments over time. Spot patterns may also be ontogenetic, e.g., origination and development of an organism, so the fish identification process could be used to compare multiple "fish faces" with harvest or feasting times and used to create a model to determine the optimal time to harvest fish.

In some cases, sea lice may cause higher cortisol levels in fish. The higher cortisol levels are believed to affect the generation of new spot patterns on some fish, such as salmon.

Additionally, a targeted capture device can be developed that searches for a particular identity of fish in the fish pen. The targeted capture device searches for a particular fish based on the fish's spot pattern. For example, the targeted capture device can search for a specific fish that is known to have a disease or other issue, which has been tracked over time, to quarantine it from affecting the other fish in the fish pen. This would enable more accurate and directed treatments for diseased fish that could enable earlier treatment of an identified disease and subsequently, prevent the spread of disease at a much earlier stage, thereby increasing overall yield of farmed fish in the pen.

Another application of the fish identification process includes the certification process for facilities. For both marine stewardship council (MSC) and aquaculture stewardship council (ASC) certifications, a high level of data assurance is required. In the ASC process, one is required to document fish escapes and justify the quality of one's fish counting method. Using the number of fish derived via counting and post-mortem processing, one could create a model to correlate the number of unique identities seen by the camera in pen for a selected period of time with the actual number of fish in the structure 104. This would allow much higher confidence in the escapes metric, as an example, with a much cheaper, hands-off technology.

Similarly, MSC certification requires a metric of effectiveness in tracking fish progress while rebuilding stock. A fish identification system would not only enable easier collections of such data, which may even lower the cost barrier to entry to allow more players to obtain certification. Existing end-to-end traceability platforms could be also improved with the addition of a unique fish's identity and associated history. This way consumers can be even more confident about the quality and condition of the specific fish they are purchasing, potentially allowing for price increases consistent with marketplace preferences for transparency and quality assurance.

Additionally, applications of fish identification could even extend beyond aquaculture. For example, one of the best ways to assess coral reef health is by counting the number of fish present. Thus, by counting the number of fish present, and believing that the count is reliable and accurate, the assessment of coral reef health can be accurately measured.

In some implementations, the system 100 illustrates stages (A) through (G) for performing fish identification. The process includes identifying a particular fish from the aquatic cargo within the structure 104 by first capturing media of the particular fish. For example, the camera captures media of the fish and transmits the media of the fish to the monitoring server 102. The monitoring server processes the media of the fish by (i) generating a high resolution image of the fish from the transmitted media, (ii) generating a cropped representation of the high resolution image, (iii) generating an embedding corresponding to the cropped representation of the high resolution image, (iv) associating the embedding with a particular cluster, and (v) storing the data representing fish identification within a fish faces database 130. The stages (A) through (G) illustrate one exemplary implementation for the process of fish identification, but can also be performed in a different manner, in a different order, or include additional and a smaller number of stages.

During (A), the camera capture unit 110 captures media of a particular fish. In some implementations, the monitoring server 102 moves the camera capture unit 110 to a particular location within the structure 104 to capture media of aquatic cargo. For example, the monitoring server 102 may move the camera capture unit 110 to the feeder location within the structure 104 to capture aquatic cargo currently feeding. A particular type of cargo may be attracted based on the type of food provided from the feeder. In another example, the monitoring server 102 can move the camera capture unit 110 to the surface or near the edge of the structure 104. The monitoring server 102 can move the camera of the camera capture unit 110 vertically along the rod and rotationally around the rod to a particular position in an X-Y-Z axis and 360 degree space, respectively.

In some implementations, the monitoring server 102 instructs the camera capture unit 110 to record media. The recorded media can include a video stream, such as an MPEG video stream for example, or can include a burst of images over a predetermined period of time. The monitoring server 102 can instruct the camera capture unit 110 to stop recording media. Additionally, the monitoring server 102 can instruct the camera capture unit to record at various intervals, record over a predetermined period of time, record in the future for a predetermined period of time, or record for a predetermined period of time once the camera capture unit 110 has moved to the desired location. The recording settings are configurable.

In some cases, the camera capture unit 110 may store the recorded media in its memory before transmitting the recorded media to the monitoring server 102. In some cases, the camera capture unit 110 automatically transmits a live media feed to the monitoring server 102 without storing any recorded media. The camera capture unit 110 can also transmit the live media feed or recorded media to other devices wirelessly, such as other client devices, like a mobile device or external personal computer.

The camera capture unit 110 can then record media of the aquatic cargo. In some implementations, the camera of the camera capture unit 110 may record media of a particular fish. For example, system 100 illustrates the camera of the camera capture unit 110 recording media of fish 112, which may be a salmon. In some implementations, the camera of the camera capture unit 110 may record media of multiple fish. In this example in which multiple fish are recorded, the monitoring server 102 may identify a particular fish to track for identification from the multiple fish. Thus, the camera capture unit 110 can record media of a single fish, such as fish 112, or multiple fish.

During (B), the camera capture unit 110 transmits the recorded media 114 to the monitoring server 102. The recorded media 114 may include a live video stream or a recorded video stream of the one or more fish. Additionally or alternatively, the recorded media 114 may include a burst of images of the recording of the one or more fish. The recorded media 114 can also include packaged sensor data describing the environment of the ocean water surrounding the one or more fish that were recorded. For example, the packaged sensor data can include thermal imaging data, data from pressure sensors indicating the strength of the ocean current, data from the water quality sensor indicating the turbidity of the water surrounding the one or more fish that were recorded, and sound data recorded from the hydrophone.

The camera capture unit 110 can transmit the recorded media 114 to the monitoring server 102 over a wireless or wired network. Alternatively, the camera capture unit 110 can store the recorded media 114 in its internal or external memory. In the case that the recorded media 114 is stored in internal or external memory, the monitoring server 102 can periodically retrieve any recorded media 114 that has recently been added to the memory. Alternatively, the camera capture unit 110 can transmit a notification to the monitoring server 102 when new recorded media 114 is stored in memory, such that the monitoring server 102 can retrieve the recorded media 114 from the camera capture unit 110's memory.

During (C), the monitoring server 102 obtains the recorded media 114 and provides the media to the image recognition module 116. The image recognition module 116 generates a high resolution image 118 of the fish 112 from the recorded media 114. In particular, the image recognition module 116 can rely on one or more computational photography techniques to produce the high resolution image 118 of the fish 112. For example, if the image recognition module 116 obtains a live video stream in the recorded media 114, then the image recognition module 116 chops the live video stream into a burst of images. For example, the number of burst images can range from 20 to 50 images of the fish. If the recorded media 114 already includes the burst of images, then the previous step of chopping up the images can be skipped.

In some implementations, the image recognition module 116 generates the high resolution image 118 by combining a moving window of the burst of images to produce a super resolution image with minimal noise. In particular, the high resolution image 118 is generated by, for example, combining 10 images with 5 prior images and 5 following images. The image recognition module 116 only needs to extract and generate a high resolution image 118 of a single fish, so images that don't meet this criteria can be dropped. For example, the monitoring server 102 can drop various images or video streams from the recorded media if the identified fish within the high resolution image 118 is not equal to or above a predetermined threshold, such as 15 inches.

Additionally, the monitoring server 102 can drop various images or video streams if the pose of the fish is not appropriate. The image recognition module 116 may take additional steps to determine whether the fish is facing directly the camera, whether the fish is facing away from the camera, when an area of the fish face is too small, or whether the fish is angled away from or towards the camera. Ideally, the side of the fish's body would be located perpendicular to the surface lens of the camera. In this case, the monitoring server 102's techniques will have an easier time identifying, and subsequently, re-identifying the fish using its characteristics. The image recognition module 116 can use various image identification techniques, such as a pose estimate, to detect a direction to which the fish is facing in the image.

The monitoring server 102 can also drop various images if the camera capture unit 110 is not located at a particular depth within the structure 104. For example, if the ocean current affects the movement of the camera capture unit 110 by moving its location a certain distance away from the monitoring server 102's desired location for the camera capture unit 110, then the monitoring server 102 can drop any images recorded by the camera capture unit 110 when it is located away from the desired location. Once the monitoring server 102 determines the camera capture unit 110 is located in the desired location, the monitoring server 102 allows images to be processed by the image recognition module 116.

The monitoring server 102 can also analyze the sensor data received from the recorded media to determine whether the image recognition module 116 and the subsequent modules will be able to produce a high precision recognition of the fish. For example, the monitoring server 102 can analyze the turbidity of the water received in the sensor data to determine whether a fish can be recognized and identifiable. Turbidity can be measured in Nephelometric Turbidity Units (NTUs), and signifies an amount of scattered light from the water sample at a 90-degree angle from the incident light. For example, the monitoring server 102 can set the predetermined threshold for turbidity to be 5 NTUs. If the sensor data indicates that turbidity value is equal to or greater than 5 NTUs, then the monitoring server 102 will drop the image. Alternatively, if the sensor data indicates that the turbidity value is less than 5 NTUs, then monitoring server 102 provides the image to the image recognition module 116 for processing.

In some implementations, the monitoring server 102 determines whether to drop the image generated by image recognition module 116 based on depth of camera, pose of the fish, and water turbidity. In other implementations, the monitoring server 102 drops images from the recorded media 114 before being processed by the image recognition module 116. Once the suboptimal images have been discarded, the monitoring server 102 can provide the optimal high resolution image to the cropped representation module 120.

In some implementations, the image recognition module 116 tracks the movement of fish in the recorded media 114. The image recognition module 116 may track a movement of the particular fish across one or more frames of the recorded media and can label that track as track001, for example. Additionally, the image recognition module 116 may label other fish in the background of the particular fish's track as negative examples, for example. A negative example can be, for example, a fish that is different from an actual fish being tracked. In some examples, the negative example can be a fish that is within the same image as the fish being tracked. Alternatively, the negative example can be a fish that is within a different image of a fish being tracked. Also, the image recognition module 116 may identify tracks of movement of the other fish in the background and label those tracks as negative examples. The tracks of the particular fish to be monitored, e.g., positive examples, and the tracks of the fish in the background, e.g., negative examples, can be used to subsequently train a machine-learning model associated within the embedding generation module 124.

During (D), the cropped representation module 120 generates a cropped image 122 using the high resolution image 118. In particular, the cropped representation module 120 takes the high resolution image 118 of the fish 112 and generates a fish face based on particular spots, patterns, or stripes found on the fish. Essentially, the spots on the fish face are enhanced by the cropped representation module 120 because the spots can be used to identify and re-identify the fish. For example, spot patterns on salmon are thought to be unique and identifiable over time. While original spots may grow in size and new spots may develop, the pattern of the original spots will remain allowing for recognition of the fish. Therefore, in order to uniquely identify or recognize fish, the cropped representation module 120 performs various tasks on the high resolution image 118. First, the cropped representation module 120 focuses on various key points of the high resolution image 118. Second, the cropped representation module 120 performs an affine transformation on the key point derivations of the high resolution image 118. Third, the cropped representation module 120 forms a square "fish face" based on the affine transformation to be used by the machine-learning model. In particular, the square "fish face" ensures that at least the eye of the fish remains in the cropped image as a possible landmark on which the machine-learning model can anchor to for identification of the fish in the square "fish face."

In particular, the cropped representation module 120 crops the high resolution image 118 to a particular bounding box. The bounding box crops the image of the fish such that three elements of the fish are included. The three elements include the fish's eye, dorsal fin, and its pectoral fin. In some implementations, other elements of the fish can also be required and included. If a high resolution image 118 does not have all three of the fish's eye, dorsal fin, and pectoral fin, then the cropped representation module 120 drops the image. Additionally, the image may be dropped if the cropped representation module 120 is unable to detect the three key elements, even if they exist. In some implementations, the cropped representation module 120 may apply a filter to the high resolution image 118 based on a score of the three elements. The filter may drop one or more images if the score of the three elements is below a predetermined threshold. As will be further described and illustrated in FIG. 2, the cropped representation module 120 generates a face trapezoid for the cropped fish face.

The face trapezoid is generated by analyzing points and distances on the cropped fish face. The monitoring server 102 can use one or more software algorithms to manipulate the high resolution image 118 to generate the face trapezoid. First, the cropped representation module 120 draws a midpoint line between the fish's dorsal fin and the pectoral fin. Then, an extended line is drawn between the fish's eye and the middle of the midpoint line between the fish's dorsal fin and the pectoral fin. The orthogonal to the extended line is then shifted to extend from the fish's dorsal fin. In some implementations, the key point associated with the eye is then shifted by an offset. For example, the key point associated with the eye can be shifted by 0 pixels, 10 pixels, and 30 pixels, to name a few examples. Typically the eye is only shifted by one offset. Other variations of the trapezoid may also be created, such as through a main axis extension and a circle detection. In some examples, the main axis extension is used as the main axis for the direction of the eye shift, as opposed to simply shifting to the left of the bounding box.

Additionally, instead of using a fixed pixel shift, e.g., 10, 30 pixels, the shift is calculated with a ratio derived based on an approximation of the average radius of the eye, in attempt to increase the consistency of images. In some examples, a Hough Circle detection method is performed, which will be described with respect to FIG. 2C. The orthogonal line is then duplicated and replaced so that the fish's eye (or shifted eye) key point is the midpoint and the new duplicated line is then parallel to the orthogonal line placed at the dorsal fin of the fish. The two endpoints of this duplicated orthogonal line will be the other two points of the trapezoid. At this point, the points of these trapezoids are used to generate a perspective transformation. In some implementations, an affine transformation is then applied to the perspective transformation to generate the square "fish face."

The results of the affine transformation, e.g., square "fish face," are based on the newly-created trapezoidal points. In this case, the orientation of the square "fish face" is the same regardless of the orientation of fish in the image of the recorded media 114. In some implementations, the square "fish face" or close crop of the fish face allows a machine-learning model to focus on the spots of interest while simultaneously removing background noise, e.g., the exoskeleton of the structure 104, other fish within the structure 104, and water turbidity. In some implementations, the cropped representation module 120 applies a photography technique to the image to filter out images below a certain threshold level of sharpness. For example, the photography technique can include one or more techniques for performing a Laplacian transform, applying a Gaussian smoothing filter, a median filter, or a mean filter on the image. By applying the photography technique to the "fish face" image, the system 100 improves its recognition because the image is sharper than before. The sharp "fish face" 122 is then provided to the embedding generation module 124.

During (E), the embedding generation module 124 generates an embedding using the sharp "fish face" 122. In particular, the embedding generation module 124 includes a machine learning model that includes one or more neural network layers. The machine learning model can include a convolutional neural network (CNN) embedding model. The CNN embedding model can include one or more LTSM layers, and may be a deep LSTM neural network architecture built by stacking multiple LSTM layers.

The CNN embedding model is trained using a loss function tuned for learning differentiation features. The different features can include triplet loss function, softmax loss function, or n-pairs loss function, to name a few examples. The CNN embedding model can use the loss function to adjust its deep neural network (DNN) weights, such that the weights will minimize a distance from a particular anchor in the square "fish face" for a positive example and maximize the distance from the anchor in the square "fish face" for a negative example.

The monitoring server 102 uses a triplet mining strategy to train the CNN embedding model. For example, the monitoring server 102 uses triplet loss functions to train the CNN embedding model to create an embedding for an individual fish. The triplet loss function requires the use of anchors, positives, and negative examples, known as triplets. Anchors correspond to particular positions on the fish for tracking as the fish moves along a track. For example, the anchors can include locations on the fish, such as eye points, pectoral fins, and dorsal fins. The positives correspond to a track of the particular fish to be identified as it moves through a continuous video stream. The track may be labeled, such as track001, or can be identified by a number, such as a trackID. The positives can include the track of the fish combined from sequential frames of the continuous video stream. The negatives correspond to other fish in the background of the continuous video stream. The negatives also include the tracks of the other fish in the background and how those fish move in relation to the track of the fish being identified.

Therefore, each frame in the continuous video stream is a potential part of the triplet, e.g., an anchor, a positive, and a negative, for all the other fish in the scene. The training data can then rely on a large number of triplets with only object tracking on one particular fish in an unsupervised manner. Additionally, track merging is a common problem in multi-object tracking (MOT), e.g., when two fish swim close to one another. As a result, the triplets can assist with discerning between at least two fish swimming close to one another. For example, fish identification can be used as a method for improving the tracking of fish, e.g., if the fish identity changes mid-tracking and the weight of the fish changes, then it is likely to be a different fish that has been merged.

It also becomes possible to use negative examples of fish using objecting tracking from a physically different pen or site provided the fish have similar characteristics. The similar characteristics can include similar size range, brood stock, weight, and color, for example. Using the fish from different pens as examples of negatives, the CNN embedding model can bias its object tracking algorithms to favor splitting versus merging tracks (at the cost of a shorter track length). The bias enables split tracking, since merge tracking no longer exists, because the training data now includes a fish being tracked from one pen (positives) compared to other fish not being tracked but identified from another pen (negatives).

A final source of training data can be collected during the fish processing post mortem. In particular, the training data can be collected on a weigh bridge both before and after a particular fish has been gutted. As the dead fish pass through the weigh bridge one at a time, to be weighed, a camera is placed above the conveyor belt of the weigh bridge which allows for capturing images of the fish. The captured image of the post-mortem fish can be applied as post-mortem training data. The captured image of the post-mortem fish can be taken from both sides of the fish, which can then be run through the same preprocessing pipeline for training the CNN embedding model. Since each fish is only weighed one time during the post-mortem process, the post mortem photos are guaranteed to be unique to that particular fish. At this time, two sides of the fish can also be captured if desired. It may be beneficial to capture images of both sides of the fish to improve for combining and tracking of a particular fish.

In some implementations, both sides of the fish can be reconciled through other mechanisms. For example, post mortem on site as dead fish are collected through normal operations by taking a photo of the fish in the air on the left/right sides of the fish. In other examples, a fish may have swam in front of the camera of the camera capture unit 110 multiple times, presenting both of its sides to the camera. In this example, the fish identification process may have identified both sides of the fish and can subsequently combine the two identifications corresponding to the same fish. In particular, both sides of the fish may identify both sides of the fish when the fish turns within the field of view of the camera. In situations when an arrangement of multiple cameras is used, e.g., during a mechanical delousing, the fish identification process can still identify fish by combining the media from multiple cameras. In other examples, such as a harvest operation where the fish are moved through tunnels, or creating an arrangement of multiple cameras in the pen orient across from each other, the media can still be processed by the image recognition module 116, the cropped representation module 120, the embedding generation module 124, and the cluster identification module 128.

Once the CNN embedding model has been properly trained and applied, the CNN embedding model within the embedding generation module 124 generates an embedding from the square "fish face" image. In some implementations, the embedding can be a set of values, such as a vector, code, file, or other data, that represents characteristics of or a kind of fingerprint/identification for the square "fish face." For example, the embedding may be a multi-dimensional vector, e.g., 128 dimensional vector, or numbers representing an encoded form of characteristics of the square "fish face." In some implementations, the embedding may be generated from or represent information derived from an output layer of the trained CNN embedding model or from a hidden layer of the trained CNN embedding model. When a set of input information, such as the square "fish face" representing the fish, is provided to the trained CNN embedding model, the processing of the trained CNN embedding model may encode the information in a form that is used directly as an embedding, or is further processed to generate the embedding. As a result, the embedding may be a compressed representation of the square "fish face," where the specific values of the embedding may depend on the structure and training state of the CNN embedding model used to generate the embedding. The embedding can be mapped to a high dimensional space. For example, the CNN embedding model produces an embedding 126 that represents the square "fish face" 122, such as "011001010." The monitoring server 102 then provides the embedding 126 to the cluster identification module 128.

During (F), the cluster identification module 128 maps the embedding 126 to a particular cluster in a high dimensional space. A cluster can represent a particular volume or space within a high-dimensional space, e.g., a vector space. A cluster represents characteristics associated with a fish, where each cluster has different characteristics. For example, various clusters may exist that correspond to different sides of the same fish. Additionally, there may exist a set of clusters that match to the same fish identity, especially in the case that the fish has irregularities or deformities, such as a snout damage or bacterial infection that changes the appearance of the fish.

In general, because an embedding encodes characteristics of the square "fish face," embeddings that are generated from a similar square "fish face" should be similar. This generally results in the embeddings for similar square "fish faces" to be roughly mapped together in the high-dimensional space or mapped to a cluster having similarly mapped embeddings. Separation between clusters can be indicative of discrimination or distinct characteristics between the square "fish faces" represented by embeddings in the clusters. These properties can be used to evaluate the quality of the embeddings. For example, an embedding for a square "fish face" may be assessed to determine whether the embedding is appropriately close to other embeddings for similar looking square fish faces, and at least a reasonable distance away from embeddings for non-similar looking square fish faces. If an embedding does not match to a previously mapped embedding, the embedding may represent a newly identified fish. Alternatively, if the embedding matches to a previously mapped embedding, or closely resembles (within a predetermined threshold) a previously mapped embedding, the matching may represent a re-identification of a particular fish.

The cluster identification module 128 maps the embedding 126 to the high-dimensional space. The high-dimensional space may be an N-dimensional space, where N represents the number of dimensions, e.g., number of values, in each embedding. For example, the embedding may be a 128-element array of 64 byte values, and may be compared to other embeddings in a 128-dimensional space. Other N-dimensional spaces are possible, depending on the number of dimensions provided in the embedding.

The high dimensional space can include various regions or clusters that correspond to various fish types. The closer the cluster identification module 128 maps the received embedding 126 to one of the regions or clusters in the high-dimensional space, the higher likelihood that the received embedding includes similarities to other fish faces that were similarly mapped in that region or cluster. For example, one cluster may exhibit fish having a longer distance between the pectoral fin to the dorsal fin. Another cluster may exhibit fish having a longer distance between the midpoints of its eye to the dorsal fin. Thus, fish that exhibit these traits may be similarly grouped together within these clusters.

In some implementations, each region within the high dimensional space can include an ideal embedding corresponding to the center of the cluster. The ideal embedding may indicate specific characteristics associated with a particular cluster. The cluster identification module 128 can use the ideal embedding associated with each embedding to determine a likelihood that a received embedding corresponds to that particular cluster. For example, the cluster identification module 128 can compare the received embedding 126 to each ideal embedding in the high dimensional space to determine which cluster categorization for the received embedded 126. For example, the cluster identification module 128 can employ a nearest neighbor algorithm to determine which ideal embedding the received embedding 126 is in nearest proximity to in the high dimensional space.

The cluster identification module 128 may compare the distance between the received embedding 126 and the ideal embedding to a threshold value. A vector measurement, for example, may be used to determine the vector distance between the received embedding 126 and the ideal embedding corresponding to each cluster. The closest vector measurement to the ideal embedding typically indicates that the received embedding 126 corresponds to that cluster. Alternatively, if the vector distance between each ideal embedding in the high dimensional space and received embedding 126 is greater than a predetermined threshold, then the cluster identification module 128 generates a new cluster for that received embedding 126. In this example, the received embedding 126 becomes the ideal embedding for the new cluster. In some examples, the cluster identification module 128 may compare the distance between the received embedding 126 and a median embedding corresponding to a particular cluster. For example, the median embedding corresponds to an average of all the embeddings that corresponds to a particular cluster.

In some implementations, the creation of a new cluster corresponds to the identification of a new fish. For example, because an embedding corresponds to a particular fish, if an embedding does not compare closely to any other embeddings within a cluster or does not compare closely to any other ideal embeddings, the cluster identification module 128 generates a new cluster. As such, the identification of a new cluster represents the identification of a new fish within the fish pen.

In some implementations, the cluster identification module 128 may compare the received embedding 126 to one or more embeddings within the mapped cluster. For example, the cluster identification module 128 can determine the quality of the detection based on how close the embedding 126 is to the other embeddings. If the embedding 126 is within a predetermined distance to one or more embeddings within the mapped cluster, then the cluster identification module 128 may deem the identification as a high detection. In some implementations, if the embedding 126 closely resembles or is identical to another embedding within the mapped cluster, the cluster identification module 128 may indicate that a re-identification has been found. In particular, the embedding 126 may differ by a few bytes, for example, or may be nearly identical to another embedding.

The cluster identification module 128 can then transmit a notification to the fish faces database 130 and/or to a client device indicating that a re-identification of a fish has been found. A user can review the notification and analyze the corresponding embedding, the match, recorded media 114, high resolution image 118, and the cropped image 122 to determine whether an actual match exists. If the user determines a match does not exist, the user may provide feedback, through the client device, to the monitoring server 102 or at the monitoring server 102 to fine tune the CNN embedding model to produce the correct embedding. For example, the user may provide the actual embedding of the fish or an indication that the fish is a negative example, and should not be identified as the embedding to which it was matched to. A training model, later described, can use this data to fine tune the CNN embedding model.

In some implementations, if the location of the embedding 126 is greater than the predetermined distance to one or more embeddings within the mapped cluster, then the cluster identification module 128 may deem the identification as a low detection or deem the identification as a newly identified fish. The quality of the detection may be stored in the fish faces database 130 for review at a later point in time. In some examples, the cluster identification module may use Lowe's ratio test to determine how close proximity embeddings (and their corresponding identification data) are to one another. Other techniques may be used to determine proximities of embeddings to one another.

In some implementations, each cluster can correspond to a side of a fish and if the fish is observed sufficiently or frequently over the fish's life cycle, the fish can be tracked over time. For example, the fish starting as a smolt can be monitored as a fish matured to a full adult. Consequently, it is expected that the cluster associated with the embedding of this fish will drift in the high dimensional space. The cluster will drift because criterion associated with that fish will change as the fish matures. For example, the criterion includes new spots will appear on the fish and the fish will grow in length, size, and weight. Additionally, the distance between spots on the fish may change. Ultimately, the orientation of the spot pattern and the arrangement of the spot pattern will remain the same, but new spots may form on the fish. These changes will ultimately affect the CNN embedding model's creation of embeddings.

Because the embedding is a particular fingerprint like representation of the square "fish face," the embedding values may change as the fish ages. Consequently, the location of the embedding in the high dimensional space will change, which will ultimately affect the location of the cluster, thereby moving the median of the cluster over time. However, if a fish is seen or identified less frequently, the embedding generated may move further and further away from its initial cluster to the point that the embedding may now be recognized as a completely different fish. To correct this issue, fish in the structure 104 should be identified frequently. Additionally, various thresholds can be applied to ensure that previously identified fish are not subsequently identified as different fish. For example, the threshold can be used to determine whether or not an embedding will be labelled as the same identity as another embedding based on the distance between the two embeddings in the metric space. In this case, the threshold represents the value above which an embedding is considered in the positive class. In another example, lowe's ratio test would be used and the threshold would depend upon the dimensionality of the metric space, how likely fish twins are found to be identified, and the number of fish in the metric space.

During (G), the cluster identification module 128 provides the fish identification data 132 to the fish faces database 130. In particular, the cluster identification module 128 provides the embedding, the mapped cluster of the embedding, and nomenclature for the fish in the fish identification data 132 to the fish faces database 130. The fish faces database 130 may be included in the monitoring server 102 or may be stored externally to the monitoring server 102. For example, fish identification data 132 illustrates that the cluster identification module 128 maps fish001 and fish003 to cluster 1 due to their similar characteristics. In another example, the cluster identification module 128 maps fish002 to cluster 3 based on their similar characteristics. In another example, the cluster identification module 128 maps fish004, fish005, fish006, and fish007 to cluster 2 and fish008 to cluster 1. As illustrated in system 100, the cluster identification module 128 maps the identification of embedding 126 to cluster 3 in table entry 134. In some implementations, the mapping of fish to a particular cluster indicates an identified fish. In this case, fish001 and fish003 correspond to the same fish.

In some implementations, the fish faces database 130 can also store other data associated with the received embedding, the mapped cluster, and the nomenclature. For example, the fish faces database 130 may also provide the recorded media 114, the high resolution image 118, and the square "fish face" 122 associated with a corresponding embedding. By storing photos of fish in the fish faces database based on some criteria, e.g., a typical condition factor for the weight or a fish that has good identification recognition history, then an implementer or designer of the system 100 can generate perception models that may be used to track progression of disease, weight, size, and other criteria of the fish, over time.

Each time a fish is identified, the cluster identification module 128 names the fish for identification in the fish faces database 130. For example, the name can be as simple as an identified, such as 001, or with more detail, such as fish001. In some implementations, the cluster identification module 128 may provide an indication of re-identification if the cluster identification module 128 generates an embedding that matches exactly to a previously generated embedding stored in the fish faces database 130. The indication can include the embedding, the corresponding mapped cluster, and an indication that the embedding is a match to another embedding. The fish faces database 130 may include the indication with a previously stored embedding identification to denote a re-identification. In this manner, a user reviewing the fish faces database 130 can determine how many times a particular fish has been re-identified.

Figure 2A:
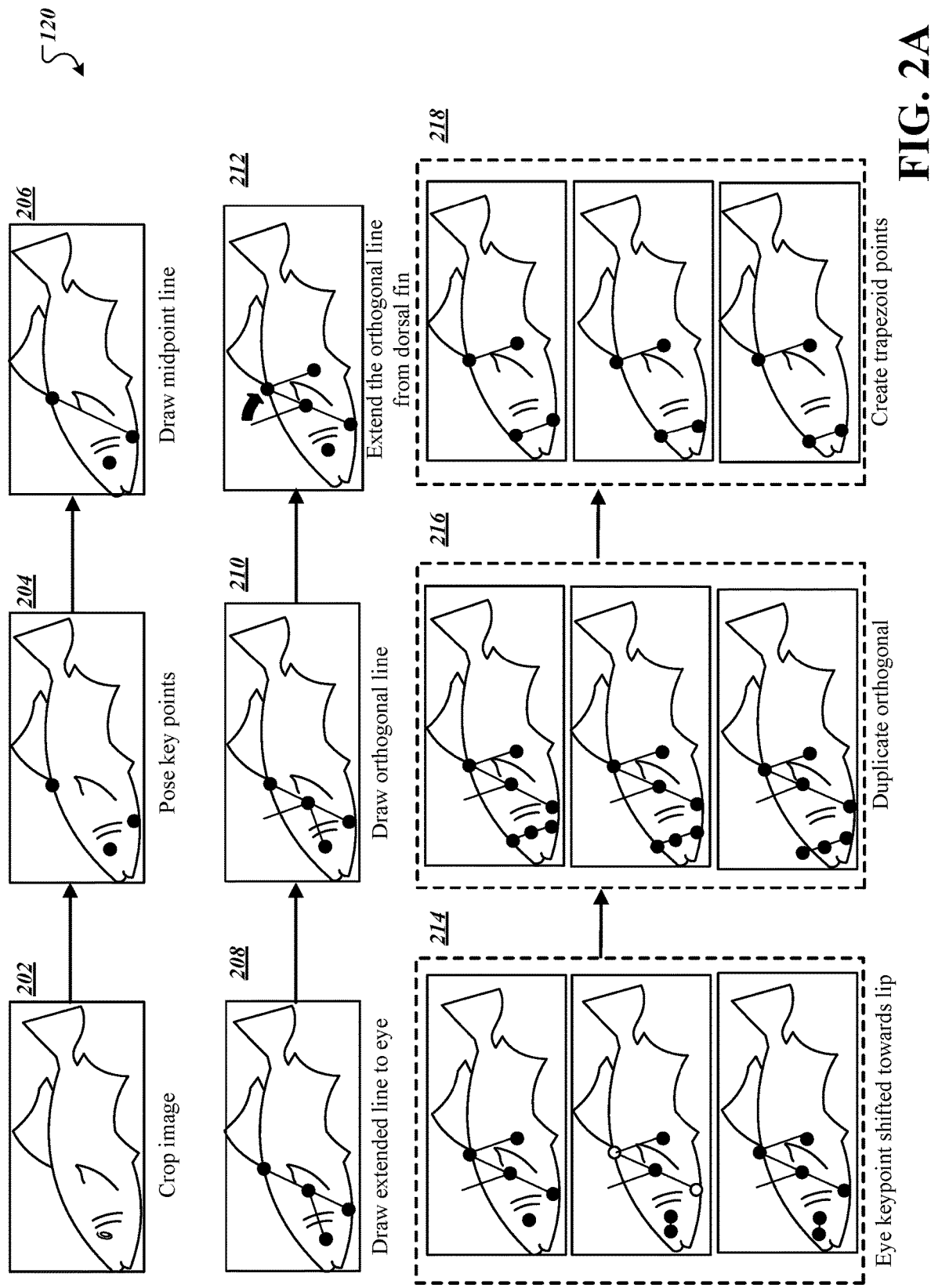
FIG. 2A is a diagram that illustrates an example process for generating a cropped representation of a fish.
Figure 2B:
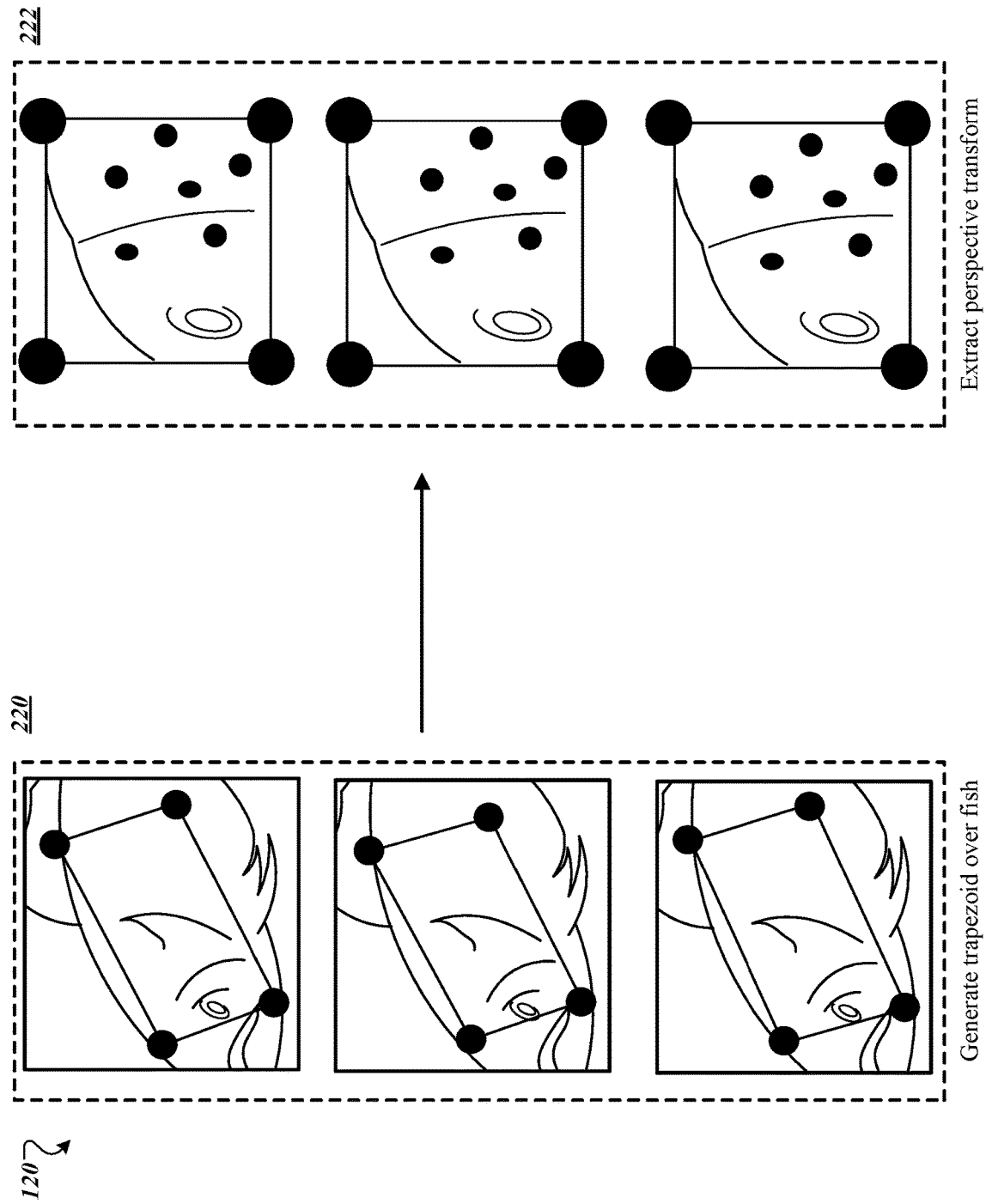
FIG. 2B is another diagram that illustrates an example process for generating a cropped representation of a fish.
Figure 2C:
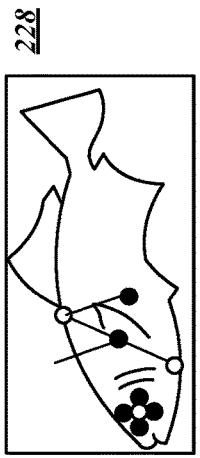
FIG. 2C is another diagram that illustrates an example process for generating a cropped representation of a fish.
Figure 2C:
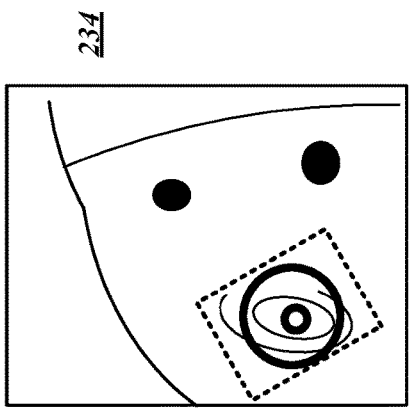
Figure 2C:
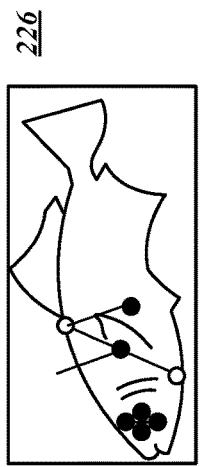
Figure 2C:
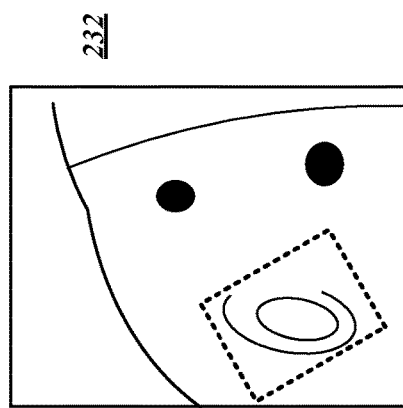
Figure 2C:
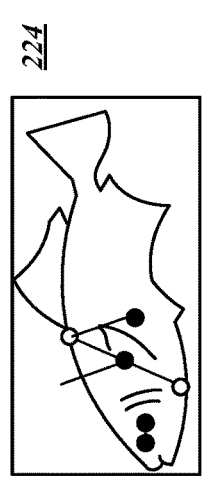
Figure 2C:
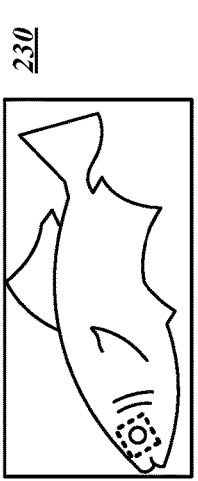
Figure 2C:
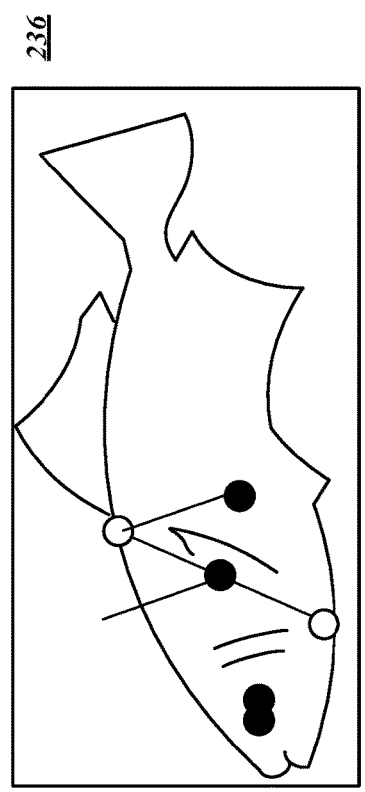

FIGS. 2A-2C are diagrams that illustrate an example process for generating a cropped representation of a fish. The process shown in FIGS. 2A-2C provides more detail into the operation of the cropped representation module 120. For example, the cropped representation module 120 first receives a high resolution image of a fish from the image recognition module 116. The cropped representation module 120 crops the high resolution image of the fish to minimize the background while ensuring the length of the entire fish is maintained in the cropped image (202). If the entirety of the fish is not shown in the high resolution image, then the cropped representation module 120 drops the image.

The cropped representation module 120 places key points on the fish within the cropped image (204). In particular, the key points that must be included within the cropped image include the fish's eye, the fish's dorsal fin, and the fish's pectoral fin. The dorsal fin is the top fin of the fish and the pectoral fin is the bottom fin on the fish. If any of these points are not found within the cropped image, the cropped representation module 120 ceases processing the cropped image. The cropped representation module 120 poses points on the cropped image at the fish's eye, the fish's dorsal fin, and the fish's pectoral fin. Other key points may also be sued on the fish.

The cropped representation module 120 draws a midpoint line between the key point of the fish's dorsal fin and the key point of the fish's pectoral fin (206). The midpoint line is used for tracking initiating the creation of the trapezoid. The trapezoid will be described below.

The cropped representation module 120 defines a midpoint on the midpoint line and draws a line from the midpoint to the key point of the fish's eye (208). The line drawn will touch the midpoint of the line and the key point of the fish's eye.

The cropped representation module 120 draws an orthogonal line from the fish's eye (210). The orthogonal line may be drawn to the height of a predetermined height. The predetermined can be, for example, the height of the fish's dorsal fin or the greatest width of the fish.

The cropped representation module 120 then shifts the orthogonal line from the eye point to the dorsal fin key point (212). This shifted orthogonal line provides one side of the trapezoid for the fish identification.

The cropped representation module 120 then shifts the key point associated with the eye (214). The cropped representation module 120 can shift the key point associated with the eye by 0 pixels, 10 pixels, or 30 pixels, to name a few examples. The top box in 214 illustrates the key point does not shift. The middle box illustrates the key point associated with the eye shifting by 10 pixels and the bottom box illustrates the key point associated with the eye shifting by 30 pixels. Other pixels amounts of shifting are also possible.

The cropped representation module 120 then duplicates the orthogonal line from the midpoint and draws the duplicate orthogonal line overtop of the key point associated with the fish's eye (216). In this step, the cropped representation module 120 draws the duplicate orthogonal line over the fish's eye so that the key point of the eye is the midpoint and is parallel to the orthogonal line drawn at the dorsal fin of the fish. These two orthogonal lines create the end sides of the trapezoid.

The cropped representation module 120 uses the four points as the basis for its trapezoid (218). Three trapezoids are subsequently generated, one trapezoid for each set of four points.

Continuing to FIG. 2B, the cropped representation module 120 creates the trapezoid for each of the four data points (220). The trapezoid is used for enhancing the important portion of the image, which will subsequently be used by the embedding generation module 124 to create the embedding.

The cropped representation module 120 creates a perspective transform of the trapezoid (222). The perspective transform include a two-dimensional image of a three-dimensional object, e.g., fish. The cropped representation module 120 applies an affine transformation to the perspective transform to generate the square "fish face." The affine transformation is based on the newly-created trapezoidal points, so that the orientation of the square "fish face" is always the same regardless of the orientation of the fish in the recorded media 114. The affine transformation is performed such that the perspective transform preserves collinearity, e.g., all points lying on a line within the square "fish face" initially still lie on a line after transformation, and ratio of distances, e.g., the midpoint of a line segment remains the midpoints after transformation. However, the angles and lengths of the images may change as a result of the affine transformation, but the proportions of lines in the perspective transform remain the same.

The cropped representation module 120 then outputs the square "fish face" to the embedding generation module 124 for processing.

FIG. 2C illustrates the Hough Circle detection method performed. In particular, rather than performing the main axis extension method as illustrated in FIGS. 2A-2B, the Hough Circle detection is applied on a close crop image of the fish's eye. The Hough Circle detection monitors the placement of the fish's eye by refining the eye keypoint before continuing to perform the keypoint shift. If a circle is not detected by the system, then the image is discarded and not used for further training in the embedding generation module 124.

The cropped representation module 120 shifts a keypoint associated with the fish's eye (224). The cropped representation module 120 can shift the key point associated with the eye by 0 pixels, 10 pixels, or 30 pixels, to name a few examples.

The cropped representation module 120 generates multiple keypoints associated with the fish's eye (226). Each keypoint is placed at a location extended along different axis across the fish's eye. For example, a keypoint is placed at both ends along a vertical axis across the fish's eye and a keypoint is placed at both ends along a horizontal axis across the fish's eye. Each keypoint is placed around the fish's eye such that the cropped representation module 120's focus is on the central location of a fish's eye.

The cropped representation module 120 inserts a keypoint over the fish's eye and in between each of the keypoints placed along the multiple axes (228).

The cropped representation module 120 removes each of the keypoints placed along the multiple axes over the fish's eye (230). Additionally, the cropped representation module 120 generates a box to overlay surrounding the keypoint covering the fish's eye.

The cropped representation module 120 crops the image to focus on the location of the box covering the fish's eye (232).

The cropped representation module 120 generates a multiple circles overlaid over top of the fish's eye (234). These multiple circles are used for tracking the eye keypoint of the fish in the image. Should any image not include the eye keypoint or not include a sufficient tracking of the eye keypoint by the multiple circles, then the image is dropped from training.

The cropped representation module 120 tracks the center of the fish's eye continuously across multiple images (236).

Figure 3:
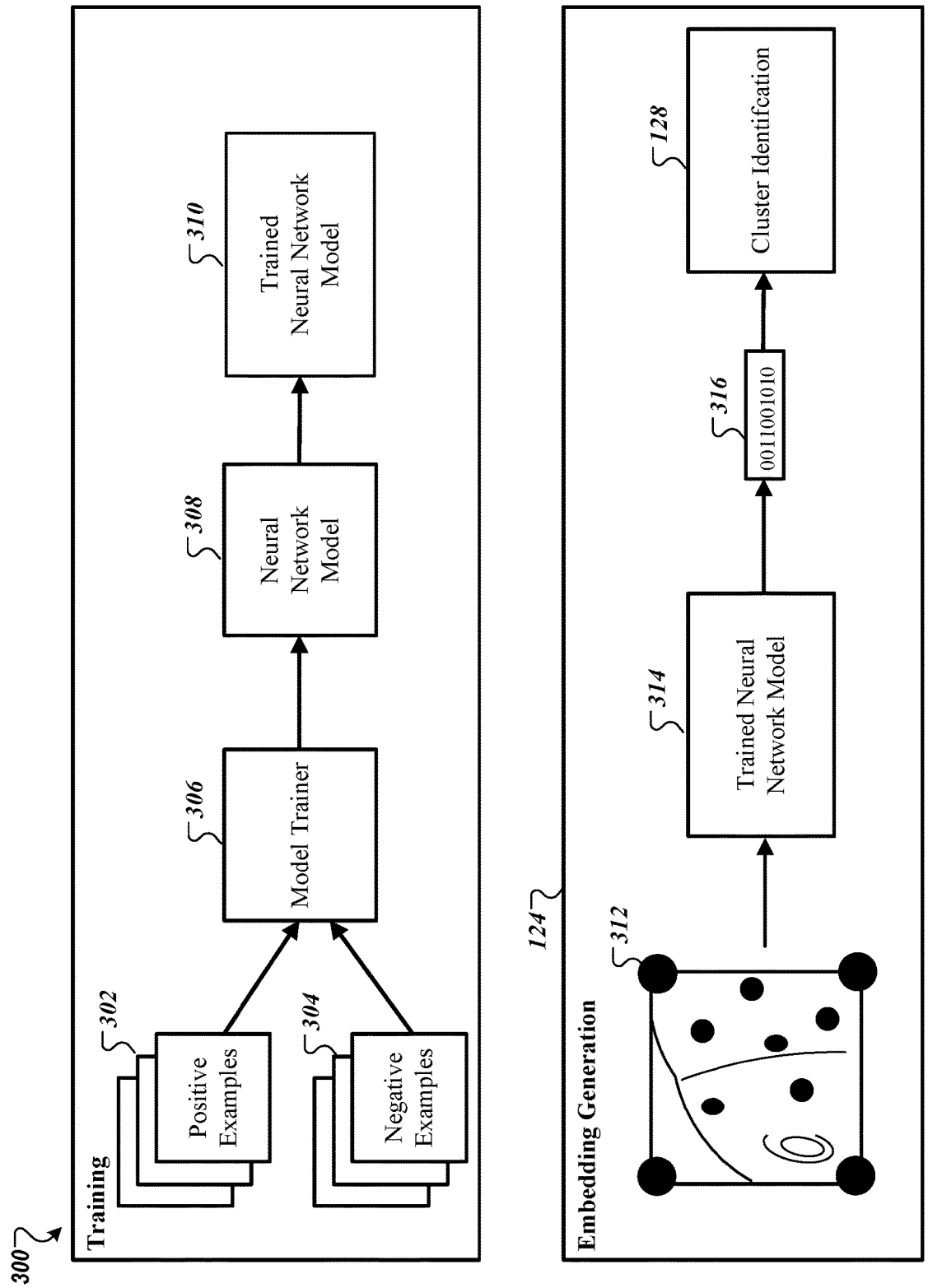
FIG. 3 is a diagram of an example system for training and applying a model that is configured to generate an embedding based on a cropped representation of a fish.

FIG. 3 is a diagram of an example system 300 for training and applying a model that is configured to generate an embedding based on a cropped representation of a fish. Briefly, and as described in more detail below, the system 300 illustrates the training phase for the neural network model that is configured to generate an embedding for each square "fish face" provided by the cropped representation module. The system 300 also illustrates the usage of the model for generating the embedding and providing the embedding to the cluster mapping. In some implementations, the embedding generation module 124 of FIG. 1 may train and apply the model.

As illustrated in the training phase of FIG. 3, the model trainer 306 receives data for training the neural network model 308. For example, the model trainer 306 receives positive example data 302 and negative example data 304. The positive example data 302 can include recorded video streams of a single fish's movement along a single track. The single fish's movement may be the anchor within the positive example data 302. The negative example data 304 can include other fish within the background of the recorded video stream including the fish being tracked in the positive example data 302. Additionally, the negative example data 304 can include other video streams corresponding to background fish that are not to be tracked or other fish in a different fish pen. The model trainer 306 applies a triplet loss function to train the neural network model 308. The triplet loss function requires the use of anchors, positive example data, and negative example data, e.g., triplets. In some implementations, the neural network model is a CNN embedding model, and the CNN embedding model is trained using the triplet loss function. Other training mechanisms may also be applied to the CNN embedding model, such as, stochastic gradient descent training and backpropagation, to name a few examples.

The model trainer 306 can receive continuous video streams of fish for training data. In some implementations, the model trainer 306 may cut the video streams into images before applying the images to the neural network model 308 for training. In some implementations, the model trainer 306 can designate images from a single fish track as positive example data. Images that include background fish tracks can be used as negative example data. The model trainer 306 can avoid possible inclusion of the various tracks in the negative example data by requiring the negative examples to be within positive or negative three tracks of the original positive examples. A track is a movement of a fish over one or more frames of a continuous video stream.

In some implementations, when the neural network model 308 is being trained to identify a fish, the neural network model 308 can compute an embedding for each image in a track and then use the mean or median of the embeddings in a track to determine the fish's identity. In particular, the mean or median of the embeddings in the vector position of the metric space for all of the observations in a track can be used to identify a particular fish. The model trainer 306 can then apply the identity along with fish image to the neural network model 308 to properly train the neural network model 308. Additionally, during training, any positive or negative example data with a track and without a minimum number of frames will be discarded for both training and identification. Once the model trainer 306 has sufficiently trained the neural network model 308 using the triplet loss function strategy, the model trainer 306 can then apply the trained neural network model 310 for practical purposes.

The system 300 illustrates applying the trained neural network model 314. The trained neural network model 314 may be applied in the embedding generation module 124. The trained neural network model 314 is configured to receive a square "fish face" 312 from the cropped representation module 120 and produce an embedding 316 that provides a fingerprint or a representation of the square "fish face" 312. The system 300 provides the embedding 316 to the cluster identification module 128. The application of the trained neural network model 314 is similar to the process described with respect to FIG. 1.

In some implementations, the model trainer 306 may receive feedback from the system 300. The feedback may be similar to the data used to train the neural network model 308. The system may provide the feedback to the model trainer 306 to tune the trained neural network model 314. For example, the system 300 may use the trained neural network model 314 to generate an embedding corresponding to a particular square "fish face." The system 300 may receive data from a user or from another external party indicating that the mapping did not correctly map to a particular cluster in the high dimensional space, e.g., the embedding mapped to cluster 1 in the high dimensional space rather than mapping to cluster 2. Additionally, the user may indicate the generated embedding was incorrect or the embedding should not have matched to another embedding, when a re-identification process occurred.

The system 300 may receive additional positive example data with anchors and additional negative example data for fine tuning the trained neural network model 314. The model trainer 306 may use the newly received positive and negative example data to update the trained neural network model 314. Separate models may be used for determining the proper positive example data and negative example data that will render the trained neural network model 314 in producing the correct embedding in subsequent processing of square "fish faces." Once refined and tuned, the model trainer 306 may apply the newly trained neural network model to the embedding generation module 124.

Figure 4:
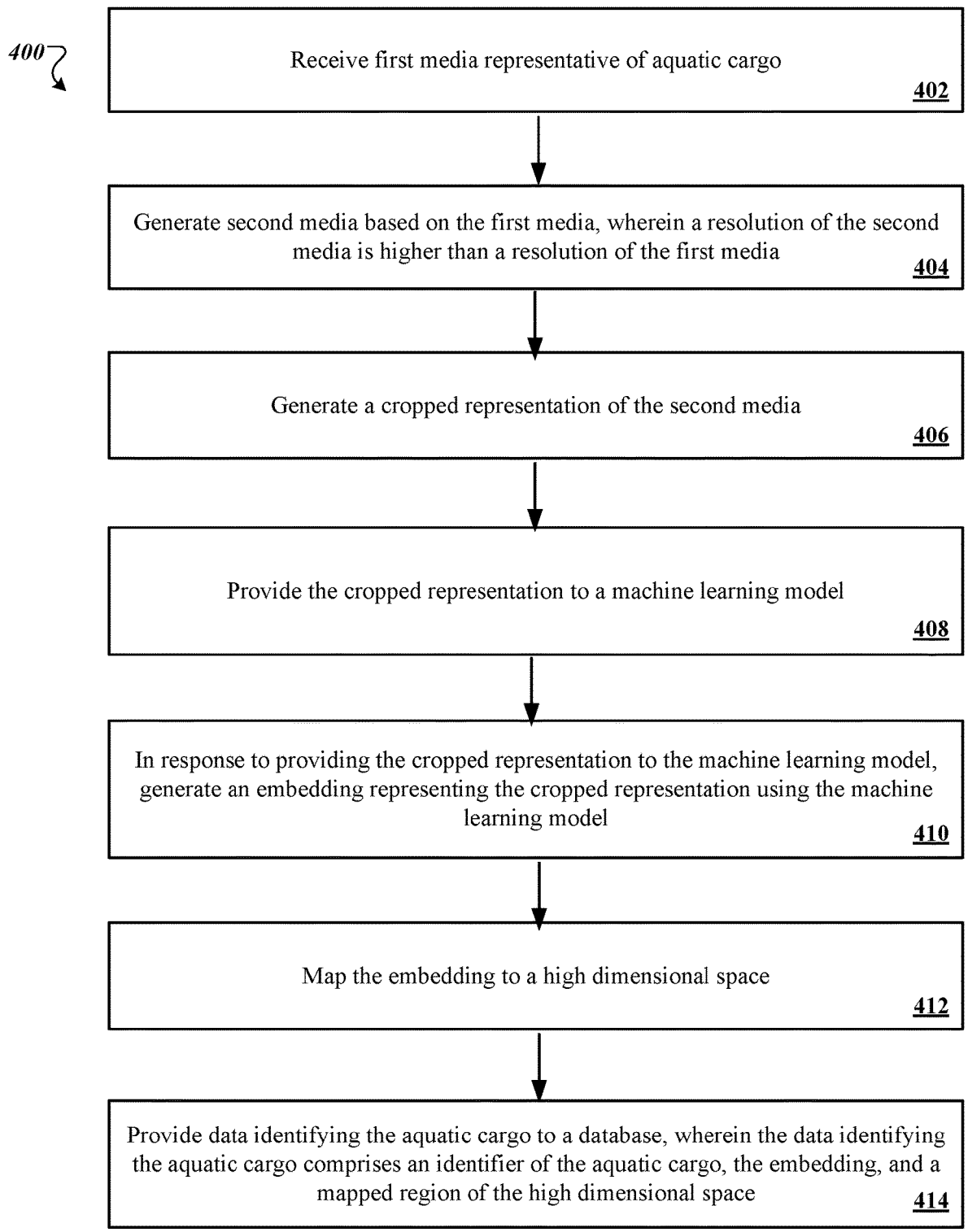
FIG. 4 is a flowchart of an example process for identifying fish based on media of fish.

FIG. 4 is a flowchart of an example process 400 for identifying fish based on media of fish. A server, such as monitoring server 102, performs the process 400.

The monitoring server receives first media representative of aquatic cargo (402). The first media can be received from the camera unit over a wireless or wired network. The first media can include a live video stream, a recorded video stream, or a burst of images of a recording including one or more fish. In some implementations, the recorded media can also include packaged sensor data describing the environment of the ocean water surrounding the one or more fish that were recorded. For example, the sensor data can include thermal imaging data, data from pressure sensors indicating the strength of the ocean current, data from the water quality sensor indicating the turbidity of the water surrounding the one or more fish that were recorded, and sound data recorded from the hydrophone.

The monitoring server generates second media based on the first media, wherein a resolution of the second media is higher than a resolution of the first media (404). In particular, the monitoring server generates the second media from the first media, and the second media is a high resolution image. If the first media is a live or recorded video stream, the monitoring server chops the video stream into a burst of images. The second media can be generated by combining a moving window of the burst of images to produce a super resolution image with minimal noise. Any images within the burst of images that do not meet a particular criteria can be dropped. For example, the criteria can include a pose of the fish, a depth location of the camera unit, a longitudinal location of the camera unit, and corresponding sensor data included within the first media.

The monitoring server generates a cropped representation of the second media (406). The cropped representation of the second media corresponds to a fish face based on particular criteria of the fish, e.g., particular spots, patterns, or stripes found on the fish. In essence, the spots on the fish face are enhanced by the monitoring server because the spots can be used to identify and re-identify the fish. This is because the spot patterns are thought to be unique and identifiable over time.

The cropped representation is generated by performing various operations on the high resolution image. In particular the monitoring server focuses on various key points of the high resolution image, e.g., the fish's eye, dorsal fin, and the fish's pectoral fin. Then, the monitoring server performs an affine transformation on the key point derivations of the high resolution image. Lastly, the monitoring server forms a square "fish face" based on the affine transformation to be used by the machine-learning model. The square "fish face" ensures that at least the eye of the fish remains in the cropped image as a possible landmark on which the machine-learning model can anchor to for identification of the fish in the square "fish face."

The monitoring server provides the cropped representation to a machine learning model (408). The machine learning model can include a CNN embedding model that includes one or more LTSM layers. The CNN embedding model can be a deep LSTM neural network architecture built by stacking multiple LSTM layers. The CNN embedding model can be trained to produce an embedding. The training can be performed using a loss function tuned for learning differentiation features. For example, the training can be performed using a triplet loss function, a softmax loss function, or an n-pairs loss function.

In response to providing the cropped representation to the machine learning model, the monitoring server generates an embedding representing the cropped representation using the machine learning model (410). The CNN embedding model produces an embedding that identifies the square "fish face" image. The embedding can include a set of values, such a vector, code, file, bits, bytes, or other data that represents characteristics of or is an identification for the square "fish face." For example, the embedding may be a vector in a 128 dimensional vector space. The embedding may also be a vector in another dimensional space, depending upon the implementation of the designer. For example, the CNN embedding model produces an embedding that represents the square "fish face," such as "1111101010."

The monitoring server maps the embedding to a high dimensional space (412). In particular, the monitoring server provides the generated embedding to a cluster identification module. The cluster identification module maps the embedding to a particular cluster in a high dimensional space. A cluster can represent an identification of a particular fish or characteristics associated with a particular fish. For example, a high dimensional space may include multiple clusters, each cluster corresponds to different fish. Additionally, there may include multiple clusters that correspond to the same fish, and each cluster corresponds to different appearances of the same fish.

The monitoring server provides data identifying the aquatic cargo to a database, wherein the data identifying the aquatic cargo comprises an identifier of the aquatic cargo, the embedding, and a mapped region of the high dimensional space (414). In response to the monitoring server mapping the embedding to the high dimensional space, the monitoring server provides the embedding, the mapped cluster of the embedding, and nomenclature for the identified fish to the database. The database may be stored external to the monitoring server. The database can also store media associated with each fish, such as the first media, the second media, and the square "fish face," each of which corresponding to the produced embedding. A user can access the database to determine what fish has been identified and a number of times each fish have been re-identified.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A method, performed by one or more processors, the method comprising:
   receiving, by the one or more processors, multiple images of a particular fish;
   generating, by the one or more processors and using the multiple images of the particular fish, a synthetic image of the particular fish that has a higher resolution than any of the received images of the particular fish;
   generating, by the one or more processors, a cropped representation of the synthetic image, such that the cropped representation includes a set of anatomical key points of the particular fish;
   obtaining, by the one or more processors from a machine learning model, an embedding for the cropped representation;
   generating a cluster identifier based on clustering the embedding in a multi-dimensional space; and
   providing, by the one or more processors, to a database, data identifying the cluster identifier for the particular fish.

2. The method of claim 1, wherein generating the cluster identifier comprises:
   determining, by the one or more processors, that the embedding matches a previously-generated embedding; and
   determining, as a result, that the particular fish associated with the embedding has been re-identified.

3. The method of claim 1, wherein generating the cluster identifier comprises:
   determining, by the one or more processors, that the embedding does not match any previously-generated embedding; and
   determining, as a result, that the particular fish associated with the embedding is newly identified.

4. The method of claim 1, wherein the cluster identifies one or more characteristics associated with fish, and wherein the multi-dimensional space comprises multiple clusters.

5. The method of claim 1, wherein the key points comprise a dorsal fin of the particular fish, a pectoral fin of the particular fish, and an eye of the particular fish.

6. The method of claim 1, comprising:
   generating, by the one or more processors, positive training data representative of a fish type;
   generating, by the one or more processors, negative training data representative of other fish types; and
   training, by the one or more processors, the machine learning model to generate embeddings using the positive training data and the negative training data.

7. The method of claim 1, wherein the embedding comprises a 128-or-more dimensional vector.

8. A system comprising one or more processors and one or more storage devices storing instructions that are operable, when executed by the one or more processors, to cause the one or more processors to perform operations comprising:
   receiving multiple images of a particular fish;
   generating, using the multiple images of the particular fish, a synthetic image of the particular fish that has a higher resolution than any of the received images of the particular fish;
   generating a cropped representation of the synthetic image, such that the cropped representation includes a set of anatomical key points of the particular fish;
   obtaining, from a machine learning model, an embedding for the cropped representation;
   generating a cluster identifier based on clustering the embedding in a multi-dimensional space; and
   providing, to a database, data identifying the cluster identifier for the particular fish.

9. The system of claim 8, wherein generating the cluster identifier comprises:
   determining that the embedding matches to a previously-generated embedding; and
   determining, as a result, that the particular fish associated with the embedding has been re-identified.

10. The system of claim 8, wherein generating the cluster identifier comprises:
    determining that the embedding does not match any previously-generated embedding; and
    determining, as a result, that the particular fish associated with the embedding is newly identified.

11. The system of claim 8, wherein the cluster identifies one or more characteristics associated with fish, and wherein the multi-dimensional space comprises multiple clusters.

12. The system of claim 8, wherein the key points comprise a dorsal fin of the particular fish, a pectoral fin of the particular fish, and an eye of the particular fish.

13. The system of claim 8, wherein the embedding comprises a 128-or-more dimensional vector.

14. The system of claim 8, wherein the operations comprise:
    generating positive training data representative of a fish type;
    generating negative training data representative of other fish types; and
    training the machine learning model to generate embeddings using the positive training data and the negative training data.

15. One or more non-transitory computer-readable media comprising instructions stored thereon that are executable by one or more processing devices and upon such execution cause the one or more processing devices to perform operations comprising:

receiving multiple images of a particular fish;

generating, using the multiple images of the particular fish, a synthetic image of the particular fish that has a higher resolution than any of the received images of the particular fish;

generating a cropped representation of the synthetic image, such that the cropped representation includes a set of anatomical key points of the particular fish;

obtaining, from a machine learning model, an embedding for the cropped representation;

generating a cluster identifier based on clustering the embedding in a multi-dimensional space; and providing, to a database, data identifying the cluster identifier for the particular fish.

16. The non-transitory computer-readable media of claim 15, wherein generating the cluster identifier comprises:

determining that the embedding matches to a previously-generated embedding; and determining, as a result, that the particular fish associated with the embedding has been re-identified.

17. The non-transitory computer-readable media of claim 15, wherein generating the cluster identifier comprises:

determining that the embedding does not match any previously-generated embedding; and determining, as a result, that the particular fish associated with the embedding is newly identified.

18. The non-transitory computer-readable media of claim 15, wherein the cluster identifies one or more characteristics associated with fish, and wherein the multi-dimensional space comprises multiple clusters.

19. The non-transitory computer-readable media of claim 15, wherein the key points comprise a dorsal fin of the particular fish, a pectoral fin of the particular fish, and an eye of the particular fish.

20. The non-transitory computer-readable media of claim 15, wherein the operations comprise:

generating positive training data representative of a fish type;

generating negative training data representative of other fish types; and training the machine learning model to generate embeddings using the positive training data and the negative training data.

* * * * *